C. W. MERRILL.
TROLLEY CATCHER AND RETRIEVER.
APPLICATION FILED OCT. 22, 1909.
1,094,916.
Patented Apr. 28, 1914.
2 SHEETS—SHEET 1.
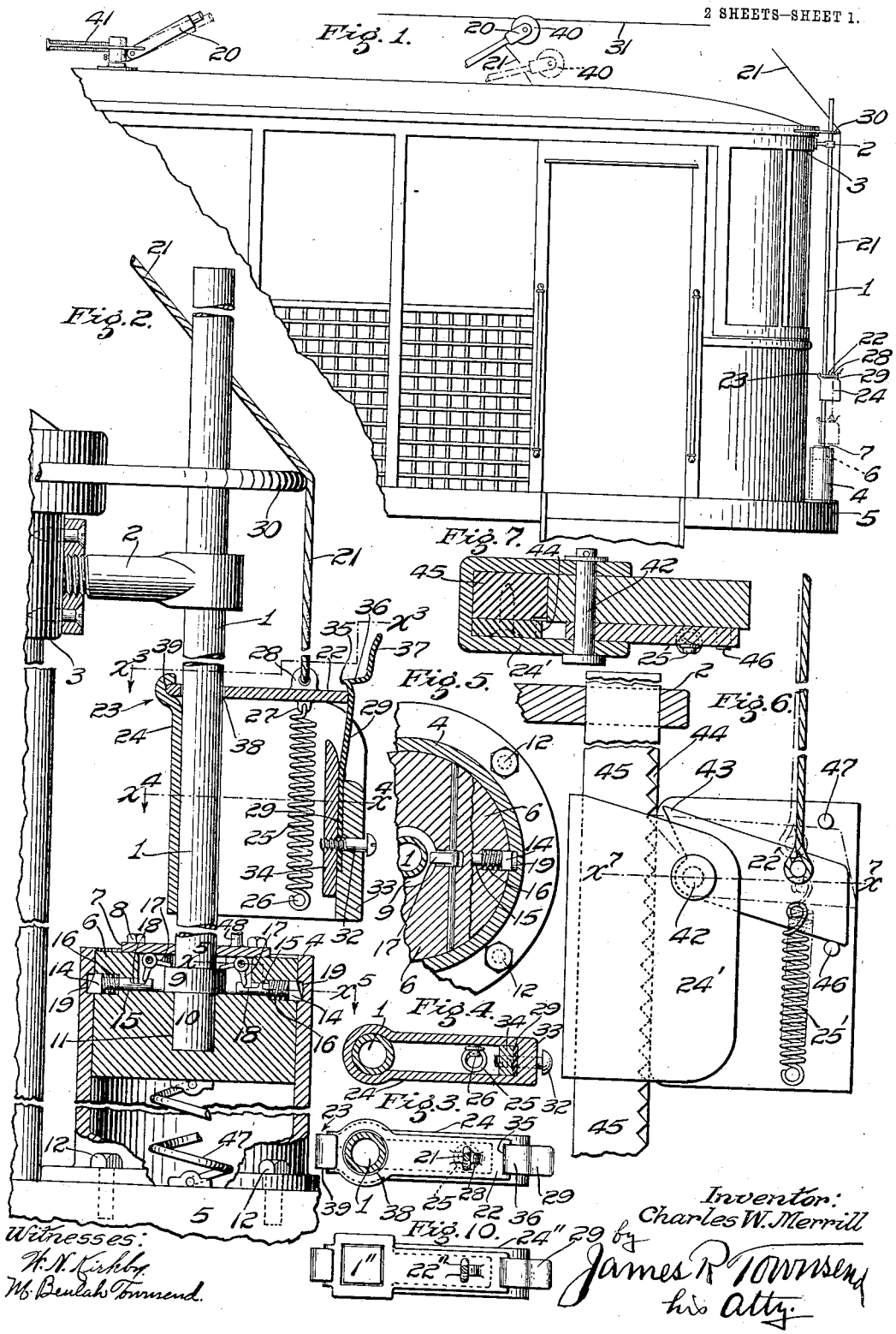
Inventor:
Charles W. Merrill
by James R. Townsend
his Atty.
Witnesses:
W. N. Kirkby
M. Beulah Townsend C. W. MERRILL.
TROLLEY CATCHER AND RETRIEVER.
APPLICATION FILED OCT. 22, 1909.
1,094,916.
Patented Apr. 28, 1914.
2 SHEETS—SHEET 2.
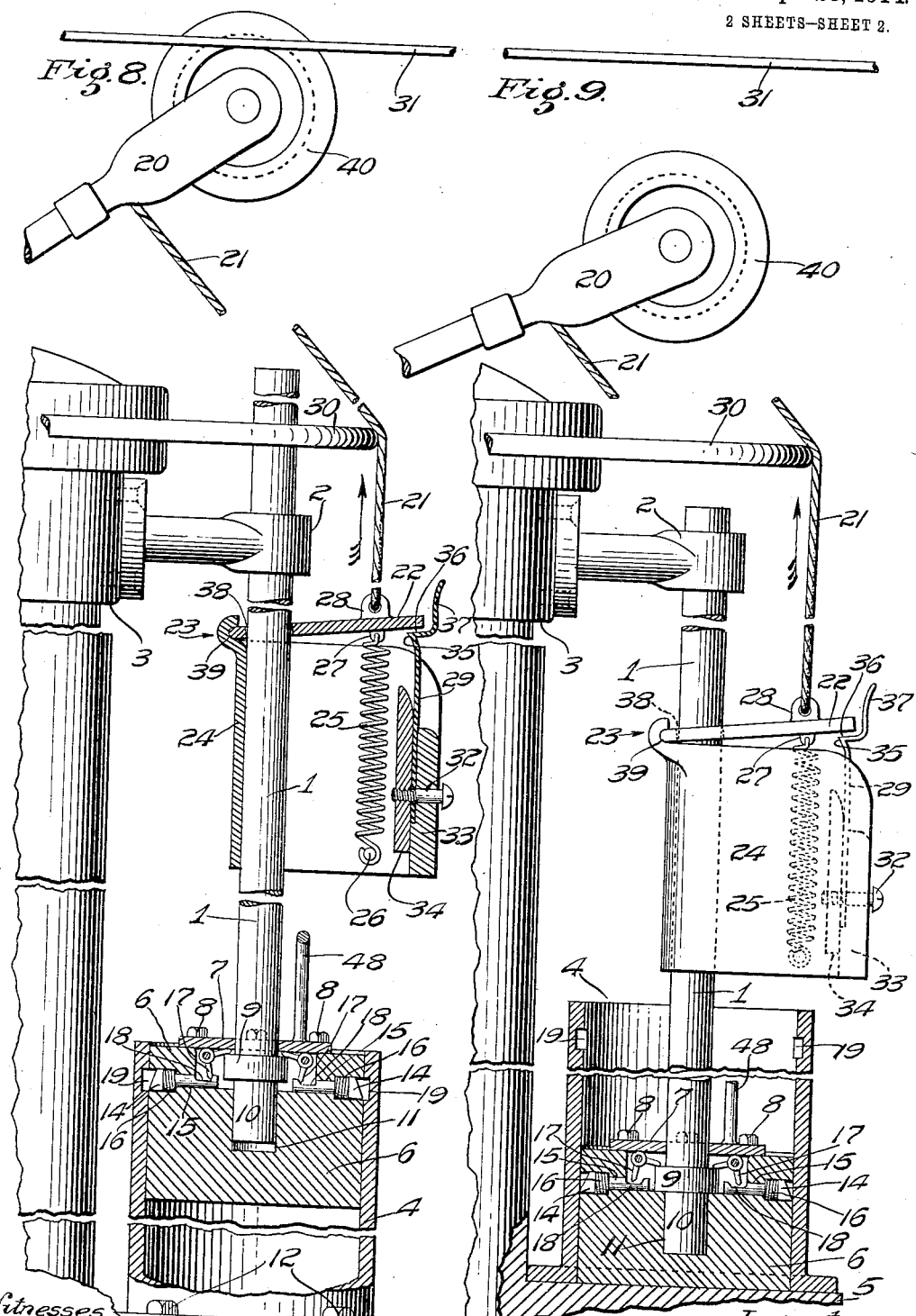
Witnesses
H. N. Kirkby
M. Beulah Townsend
Inventor:
Charles W. Merrill
by James R. Townsend
his Atty.

UNITED STATES PATENT OFFICE.

CHARLES W. MERRILL, OF LOS ANGELES, CALIFORNIA.

TROLLEY CATCHER AND RETRIEVER.

1,094,916.

Specification of Letters Patent. Patented Apr. 28, 1914.

Application filed October 22, 1909. Serial No. 524,050.

*To all whom it may concern:*

Be it known that I, CHARLES W. MERRILL, a citizen of the United States, residing at Los Angeles, in the county of Los Angeles and State of California, have invented a new and useful Trolley Catcher and Retriever, of which the following is a specification.

The object of this invention is to provide means whereby the trolley of an electric car will be restrained from upward movement after leaving the trolley wire and also cause the trolley to be drawn down below the level of the trolley wire so as to escape the span wire which sustains the trolley wire and also the trolley switches, even though the same may be lower than that portion of the trolley wire from which the trolley wheel escaped.

The invention is capable of various embodiments, a principle thereof being that for the purpose of catching the trolley there is attached to the trolley-line a clutch member that is capable of moving freely up and down along another member responsive to the gradual up and down movement of the trolley wheel, and there being yielding means to hold said clutch member normally inoperative, but allowing the clutch to operate to engage said other member upon a sudden upward movement such as the jerk caused by the spring of the trolley arm when the trolley wheel leaves the wire.

Another feature of this invention is an arrangement whereby the clutch member and said other member are immediately drawn down after the clutch member has caught said other member.

The trolley catcher may be used either with or without the retriever.

The accompanying drawings illustrate the invention in some of the forms in which it may be embodied.

Figure 1 is a fragmental side elevation showing a trolley-car equipped with the invention in one of its forms, the trolley arm being broken and the trolley displaced to contract the view. The clutch and clutch carrier are shown in solid lines as they appear before the trolley leaves the wire. Dotted lines indicate the position of the trolley, the clutch and the clutch carrier after the trolley has been retrieved. Fig. 2 is an enlarged fragmental detail partly in section of the invention shown in Fig. 1. Fig. 3 is a plan of the clutch and clutch carrier from line $x^3$, Fig. 2. Fig. 4 is a plan section of the clutch carrier from line $x^4$, Fig. 2. Fig. 5 is a fragmental plan section of the retrieving weight from line $x^5$, Fig. 2. Fig. 6 is a fragmental side elevation showing another form in which the trolley catcher may be applied. Fig. 7 is a section on line $x^7$, Fig. 6. Fig. 8 is a fragmental elevation partly in section showing the position of the trolley and other parts when the trolley wheel has just escaped from the wire and the latch of the retriever has just been drawn to allow the retrieving device to operate. Fig. 9 is an enlarged fragmental view partly in section showing the position of parts when the trolley has been retrieved. Fig. 10 is a plan of the carrier and clutch and a square post or clutch holder therefor. Figs. 8 and 9 are modifications of Fig. 1.

A clutch holder 1 in the form of a post or vertical rod is held upright by a support formed by top and bottom guides. The top guide 2 is fastened to the upper part of the car 3 and the bottom guide 4 is fastened to the car bumper 5 and holds and guides a retriever comprising a weight 6 to which the lower end of the clutch holder 1 is loosely connected by a plate 7 fastened by bolts 8 to the weight 6, and a collar 9 provided on the clutch holder 1 above the lower end thereof to engage the under side of the plate 7. The lower end 10 of the clutch holder is seated in a socket 11 in the weight 6 which is preferably a cylinder and loosely fits in the guide 4 which is an upright cylinder fastened to the car-bumper 5 by bolts 12 and serves to guide the weight, and consequently the clutch holder in a vertical path. The gravity of the clutch holder 1 and the retriever, when the weight is unsupported, normally tends to lower the rod. A latch is provided to normally support the retriever in the set position shown in Fig. 2. Said latch may comprise spring-actuated latch-bolts 14 mounted in horizontal seats 15 in the retriever and normally extended by springs 16 to seat in the guide 4 to support the retriever and adapted to be retracted by bell cranks 17 which are operatable by engagement with the collar 9 in an upward movement of the clutch holder 1 and are arranged to retract the latch-bolts 14 when said clutch holder moves upward. For this purpose the lower arms of the bell cranks are engaged with the latch-bolts by means of notches 18 in the upper sides of the stems of the latch-bolts so that whenever the clutch holder 1 is moved upward relative to the retriever the latch bolts will be drawn back from their seats 19 in the upper end of the guide 4 thus to release the retriever and allow it to move down. Said seats may be formed by an annular groove in the inner wall of the guide 4.

The trolley arm 20 is connected by its trolley line 21 with a clutch 22 that is pivoted at 23 to the clutch carrier 24 which is a weight that is mounted to slide up and down the clutch holder 1. A coiled spring 25 is fastened at its lower end by pin 26 to the clutch carrier 24 and at the upper end by an eye 27 to the clutch 22 and tends to hold the clutch at rest on the weight. The clutch has an eye 28 to which the trolley rope 21 is attached.

The clutch carrier may be a practically rectangular metal casing for the clutch-retracting spring 25 and measurably conforms at one side to the clutch holder so that it moves relative thereto without undue looseness. The clutch holder may be cylindrical so that the clutch and the clutch carrier may swing freely around the same.

The clutch latch consists of a blade spring 29 fastened at its lower end to the clutch carrier 24 by a screw 32 inserted through the front wall 33 of the carrier and screwed into an elongated nut 34 between which and the wall 33 the spring 29 is clamped; and the clutch latch is slightly concave toward the clutch 22 and is provided at its upper end with a sloping shoulder 35 adapted to extend over the clutch 22 when said clutch is at rest on the top of the clutch carrier; and the clutch latch is also provided with a horizontal shoulder 36 to uphold the end of the clutch and prevent it from returning undesirably toward the clutch carrier 24 after the clutch has been withdrawn from the latching shoulder 35 which causes desirable compression of the latch so that it will quickly return to normal position to uphold the outer end of the clutch when the clutch is retracted by the spring 25. In this normal position the pressure of the clutch latch against the clutch is very slight so as to throw the strain mainly upon the clutch retracting spring 25, which has a slightly greater retentive power or strength than is necessary to withstand the pull of the trolley rope 21 during normal movement of the rope over the rope fender 30 as the trolley arm 20 moves moderately up and down while the car is moving and the trolley is restrained by the trolley wire 31. The trolley line 21 is held by the fender 30 vertically above the eye 28 and the carrier 24 is arranged to slide freely up and down the clutch holder 1 so long as the end of the clutch 22 is not in engagement with the clutch holder. The end of the clutch 22 is thus normally resiliently held spaced apart from the top of the clutch carrier 24 and when so held said member 22 is inactive. A thumb piece 37 on the clutch latch 29 enables the attendant to readily withdraw the shoulder 36 from the clutch to again allow the clutch to lie flat on the top of the clutch carrier.

The clutch 22 in its preferred form, is a cramping plate provided at one end with a perforation 38 slightly larger than the post 1, so that when the plate is canted from normal position relative to the post, it will grip the post, thus to prevent movement in one direction along the post. The end of said plate opposite that to which the trolley line 21 is attached is pivoted in a seat 39 that projects above the top of the clutch weight or carrier 24.

The clutch-retracting spring 25 is depended upon to sustain the clutch carrier 24 under normal running conditions, but the inertia of the carrier 24 is such that when the trolley wheel 40 escapes from the trolley wire 31 and starts to spring upward from the force of the usual trolley spring 41, the sudden jerk of the trolley line 21 on the clutch 22 will pull the end of the clutch 22 free from the latching shoulder 35, thus bringing the clutch into the clutching position shown in Fig. 8, whereupon it tightly grips the post 1 and prevents the line 21 from being drawn up without lifting the post. The latch will thereupon spring toward the clutch thus bringing the shoulder 36 underneath the clutch so that in case of any rebound of the trolley arm 20, due to any resiliency of the trolley line 21 or the inertia of the trolley arm when the clutch carrier has dropped to its lowermost position, the clutch can only return a comparatively slight distance from its clutching position, so that the clutch will almost instantly reclutch the clutch holder 1 when the trolley arm is again moved upward by the trolley spring 41; and any upward movement of the holder due to the clutching action will operate the bell cranks to release the retriever latches 14 and the retriever being thus released, will draw the clutch holder, the clutch and the trolley arm down a distance sufficient to insure against any contact of the trolley wheel with overhead span-wires or switches which it otherwise might strike and it is seen that by the reclutching action the trolley will be held in approximately the lowest position to which it is brought by the device. From the foregoing it is clear that the springs 25 and 29 may be of the requisite strength to alone or in combination hold the clutch 22 out of commission.

In the form shown in Fig. 6 the clutch 22' is pivoted by a pivot 42 to the clutch carrier 24' and is provided with a tooth 43 to engage in notches 44 on the clutch holder 45. Stops 46, 47, limit the movement of the clutch, relative to the carrier, and the spring 25' normally holds the clutch against stop 46 and out of engagement with the clutch holder 45.

In Fig. 2 a helical tension spring 47 is shown beneath and connecting the retrieving weight 6 with the car bumper 5. This spring is shown simply to indicate that a spring may be employed to assist in retrieving the trolley. This spring when used may be secured at its opposite ends to lugs in the retriever weight and the car bumper. In Figs. 8 and 9 said spring is omitted and spring means to retrieve the trolley will ordinarily be unnecessary.

To reset the device after the trolley has been caught and retrieved, the conductor or other attendant may draw back the latch 29 by the thumb piece 37 to allow the clutch to rest on the carrier 24 and may lift the retriever by the handle 48 until the latch bolts engage their seats. The apparatus is then ready for further use.

The clutch carrier and clutch may be simply of sufficient weight to hold the trolley line taut while the trolley is engaging the wire. A weight of about four pounds, more or less, is found very satisfactory.

The clutch holder may be of any cross sectional form desired and if it is deemed desirable that the clutch and its carrier shall not swing around on the holder, said holder may be angular in cross section and the ways therefor in the clutch and carrier may be correspondingly angular as shown in Fig. 10 where 22'' is the clutch, 24'' the clutch carrier, 1'' the clutch holder and 38'' the angular way for the holder in the clutch. In Fig. 7 the post 45 and the carrier 24' are shown angular in cross section.

I claim:

1. The combination of a clutch-holder, a clutch capable of movement along and engagement with the clutch-holder, yielding means to normally hold the clutch from engagement with the clutch-holder, and a latch to yieldingly engage the clutch and releasable by sudden movement of the clutch to allow the clutch to engage the clutch-holder.

2. The combination with a trolley arm, of a trolley line, a vertical clutch-holder, a clutch fastened to the trolley line and adapted to move along and normally out of engagement with the clutch-holder, means to hold the clutch out of engagement with said clutch holder during the normal movement of said line as the trolley moves moderately up and down, said clutch being brought into engagement with the clutch holder by a sudden movement of the trolley line, and a resilient latch to prevent the return of the clutch to normal disengaged position.

3. The combination with a trolley arm of a trolley line, a vertical clutch-holder fastened to the trolley line, a cramping clutch surrounding and adapted to move along and engage the clutch-holder, means to normally hold the clutch out of engagement during the movement of said line as the trolley moves moderately up and down, said clutch being brought into engagement with the clutch-holder by a sudden pull on the trolley line when the trolley escapes from the trolley wire, and means brought into action by the upward movement of the clutch-holder to draw said clutch-holder down.

4. A trolley-catcher comprising a clutch-holder, a weight surrounding and adapted to move up and down the clutch-holder, a clutch pivoted to the weight and adapted to engage the clutch-holder, yielding means to normally hold the clutch from engaging the clutch-holder, and a latch to engage the clutch-holder and releasable by a sudden movement of the clutch.

5. A trolley-catcher comprising an upright rod, a perforated clutch to engage the rod, a weight on which said clutch is mounted and having an orifice and slidable on the rod, means to yieldingly hold the clutch toward the weight during moderate movement thereof and to allow the clutch to engage the rod upon sudden upward movement of the clutch.

6. An upright slidably mounted rod; a weight slidable along the rod, a clutch pivoted to the weight and adapted to move with the weight and to clutch the rod upon sudden movement of the weight, and a spring fastened to the weight to hold the clutch inactive during moderate movement of the weight.

7. An upright rod, a weight slidable along the rod, a clutch comprising a cramping plate pivoted to and adapted to move with the weight and to clutch the rod, two springs fastened to the weight to hold the clutch free from the rod during moderate movement of the clutch, one of said springs acting as a latch and releasable by sudden upward movement of the clutch.

8. A clutch-holder, a clutch-carrier encircling and arranged to move up and down along the clutch-holder, a perforated horizontal clutch on the clutch-carrier and adapted to crampingly engage the clutch-holder, means on the clutch-carrier to normally hold the clutch out of such engagement, and latch means on the clutch carrier to normally engage the clutch, and adapted to be thrown out of engagement by sudden movement of the latch.

9. The combination with a trolley car, of a trolley arm, a spring to lift the arm, a line to restrain the arm, a rod slidably mounted on the car, a clutch fastened to the line and arranged to engage the rod, a carrier for the clutch and slidable on the rod, and means on the carrier for yieldingly engaging the clutch to hold it inoperative during moderate movement of the trolley arm and to allow the clutch to engage the rod upon sudden upward movement of the trolley arm.

10. The combination with a line, of a horizontal friction clutch, a clutch holder with which the clutch may engage to prevent movement of the line in one direction, a weighted clutch-carrier slidable on the clutch-holder and to which the clutch is pivoted, and yielding means to normally hold the clutch from engagement with the clutch-holder, said means being operatable by a sudden movement of the line to release the clutch to allow such engagement.

11. The combination with a line, of a clutch connected to the line, a clutch-holder with which the clutch may engage to prevent movement of the line in one direction, yielding latch means to normally hold the clutch from engagement with the clutch-holder, and means to release the clutch upon a sudden movement of the line.

12. The combination with a trolley arm and means to force the arm upward, of a line, a clutch-holder, a clutch fastened to the line and slidable along the clutch-holder, means operatable by sudden upward movement and rebound of the arm to cause clutching and reclutching of the clutch upon the clutch-holder, and means operatable by the clutching action to draw the clutch and holder downward to cause said rebound.

In testimony whereof, I have hereunto set my hand at Los Angeles, California, this 15th day of October 1909.

CHARLES W. MERRILL.

In presence of—
JAMES R. TOWNSEND,
L. BELLE RICE.

---

Copies of this patent may be obtained for five cents each, by addressing the "Commissioner of Patents, Washington, D. C."